United States Patent
Schoening

(10) Patent No.: US 9,633,087 B2
(45) Date of Patent: Apr. 25, 2017

(54) SYSTEMS AND/OR METHODS FOR CAPABILITY-AWARE DYNAMIC DISTRIBUTED EVENT PROCESSING

(71) Applicant: Software AG, Darmstadt (DE)

(72) Inventor: Harald Schoening, Dieburg (DE)

(73) Assignee: SOFTWARE AG, Darmstadt (DE)

(*) Notice: Subject to any disclaimer, the term of this patent is extended or adjusted under 35 U.S.C. 154(b) by 357 days.

(21) Appl. No.: 14/298,140

(22) Filed: Jun. 6, 2014

(65) Prior Publication Data

US 2015/0356153 A1   Dec. 10, 2015

(51) Int. Cl.
G06F 7/02       (2006.01)
G06F 17/30     (2006.01)

(52) U.S. Cl.
CPC .. *G06F 17/30545* (2013.01); *G06F 17/30442* (2013.01); *G06F 17/30477* (2013.01); *G06F 17/30516* (2013.01); *G06F 17/30598* (2013.01)

(58) Field of Classification Search
None
See application file for complete search history.

(56) References Cited

U.S. PATENT DOCUMENTS

| | | | |
|---|---|---|---|
| 5,412,756 A * | 5/1995 | Bauman | G06N 5/043 706/45 |
| 8,024,480 B2 | 9/2011 | Distefano | |
| 8,069,190 B2 | 11/2011 | McColl et al. | |
| 8,195,648 B2 | 6/2012 | Zabback et al. | |
| 8,214,325 B2 | 7/2012 | Navas | |
| 8,463,487 B2 | 6/2013 | Nielsen et al. | |
| 8,533,731 B2 | 9/2013 | Sakamoto | |
| 2012/0084317 A1* | 4/2012 | Sakamoto | G06Q 40/04 707/769 |

(Continued)

FOREIGN PATENT DOCUMENTS

EP    2 866 144    4/2015

OTHER PUBLICATIONS

Alexander Artikis, "Event Processing under Uncertainty," DEBS'12, Jul. 16-20, 2012, Berlin, Germany, 12 pages.

(Continued)

*Primary Examiner* — Bruce Moser
(74) *Attorney, Agent, or Firm* — Nixon & Vanderhye P.C.

(57) ABSTRACT

In a system including processing resources and a capability repository, a first processing resource: receives event streams from operating contexts; identifies, based upon the received event streams, a dynamically changing condition in a first one of the operating contexts; automatically decomposes, using the repository, a complex event processing query to effect a change responsive to the identified dynamically changing condition in the first one of the operating contexts; causes the first one of the operating contexts to effect the change based upon the decomposed query; and effects a related change to operation of the first processing resource that corresponds to the change caused to the first one of the operating contexts. The repository stores information regarding event sources that transmit events to the processing resources, and the operating contexts. Each operating context is associated with a respective group of event sources and with at least one of the processing resources.

18 Claims, 10 Drawing Sheets

(56) References Cited

U.S. PATENT DOCUMENTS

| | | | |
|---|---|---|---|
| 2013/0117317 A1* | 5/2013 | Wolf ................. | G06F 17/30516 707/792 |
| 2014/0095471 A1* | 4/2014 | Deshmukh ........ | G06F 17/30463 707/714 |
| 2014/0095483 A1* | 4/2014 | Toillion ............ | G06F 17/30442 707/722 |
| 2015/0248462 A1* | 9/2015 | Theeten ............ | G06F 17/30516 707/688 |

OTHER PUBLICATIONS

Event Processing Technical Society, Event Processing Glossary—Version 2.0, Jul. 2011, 20 pages.
Christof Leng et al, "Distributed SQL Queries with Bubblestorm," K. Sachs, I. Petrov, and P. Guerrero (Eds.): Buchmann Festschrift, LNCS 6462, pp. 230-241.

* cited by examiner

SYSTEMS AND/OR METHODS FOR CAPABILITY-AWARE DYNAMIC DISTRIBUTED EVENT PROCESSING

TECHNICAL FIELD

Certain example embodiments described herein relate to techniques for distributed event processing. More particularly, certain example embodiments relate to techniques for performing distributed event processing in a manner that adapts to dynamic changes in capabilities within system components.

BACKGROUND AND SUMMARY

Stream processing typically follows the pattern of continuous queries, which may be thought of in some instances as being queries that execute for a potentially indefinite amount of time on data that is generated or changes very rapidly. Such data are called streams, and streams oftentimes comprise events. Such streams often exist in real-world scenarios, e.g., as temperature readings from sensors placed in warehouses or on trucks, weather data, entrance control systems (where events are generated whenever a person enters or leaves, for instance), etc. Events may include attributes (also sometimes referred to as a payload) such as, for example, the value of temperature readings and metadata (sometimes referred to as a header or header data) such as, for example, creation date, validity period, and quality of the event. Possible events occurring in an environment typically are schematically described by so-called event types, which in some respects are somewhat comparable to table definitions in relational databases. Streams may in certain scenarios be organized in channels that in turn are implemented by an event bus. Channels and event types in this sense may be considered orthogonal concepts, e.g., in the sense that channels may comprise events of several event types, and events of the same event type might be communicated via different channels.

Event streams are typically used in computer systems adhering to the event-driven architecture (EDA) paradigm. In such systems, several computer applications each execute on distinct computer systems and are typically interconnected by a network, such as a local area network or even the Internet. Each application typically is in charge of executing a certain processing task, which may represent a processing step in an overall process, and each application typically communicates with the other applications by exchanging events. Examples include the calculation of complex mathematical models (e.g., for weather forecasts or scientific computations) by a plurality of distributed computers, the control of an assembly line (e.g., for the manufacturing of a vehicle, wherein each assembly step is controlled by a particular application participating in the overall assembly process), etc. It is noted that a multitude of processes, potentially of different applications (and thus not necessarily of one overall process), also may be supported. Generally, events may be represented in a variety of different formats. The XML format, for instance, is one common format in which events and their associated event types may be represented. For example, an event originating from a temperature sensor reading in a cooling container (e.g., used to transport temperature-sensitive goods such as bananas) could be represented in the following manner:

```
<TempReading
xmlns="http://softwareag/eventtypes/temperaturereading">
    <header valid-from="20130822:10:59:00" valid-
    to="20130822:11:00:00"/>
    <payload>
        <containerId>59834</containerId>
        <temperature>7.6</temperature>
    </payload>
</TempReading >
```

In a Complex Event Processing (CEP) system, events may be evaluated and aggregated to form derived (or complex) events (e.g., by an engine or so-called event processing agents). Event processing agents can be cascaded such that, for example, the output of one event processing agent can be the input of another event processing agent.

A typical manner to specify such evaluation and aggregation involves using CEP queries, which oftentimes are formulated in an SQL-like query language that is enhanced by some CEP-specific clauses such as, for example, a WINDOWS or RANGE clause to define conditions that relate to the occurrence of events within streams or channels. Typically, CEP systems are used to automatically trigger some activity, e.g., an appropriate reaction on an unusual situation that is reflected by the occurrence of some event patterns. The execution of such a reaction, however, typically lies outside of the CEP system. A common mechanism to trigger reactions includes querying (or having some agent(s) listening) for specific complex events on dedicated channels and executing the appropriate action when such an event is encountered.

Thus, CEP may be thought of as a processing paradigm that describes the incremental, on-the-fly processing of event streams, typically in connection with continuous queries that are continuously evaluated over event streams.

In contrast with database systems that run queries once a certain state of the data has been reached, CEP systems perform "continuous" query execution on streams, e.g., a query is "constantly" and "continuously" evaluated "forever." This approach allows CEP systems to spend much more effort on query optimization, as query compilation typically occurs only once, unless the query is modified. On the other hand, CEP systems could benefit from a mechanism for "hot redeployment" of queries to cope with changes in queries.

Several conventional techniques address complex event processing. For example, U.S. Pat. No. 8,463,487 describes a technique for having multiple CEP engines that in some instances are situated at different geographic locations and are able to communicate with each other. In this manner, complex event processing of geographically dispersed information and events that relate in some manner to a same or similar commercial application shared amongst multiple CEP engines is performed. U.S. Pat. No. 8,533,731 describes distribution of CEP queries in overload situations based on correlations "between rules." In the '731 patent, when the processing load of a virtual machine performing CEP processes exceeds a tolerance, the server can gather CEP processes with a strong correlation. Gathering such CEP processes can reduce communication processes across the rules.

U.S. Pat. No. 8,024,480 describes a CEP cloud. A query is decomposed into sub-services and distributed. U.S. Pat. No. 8,069,190 describes visual construction of parallel stream processing programs U.S. Pat. No. 8,214,325 states the following in its abstract: "Parsing of event queries in an enterprise system is described. The enterprise system receives queries, which are broken down into query components. The query components each represent segments of the query. The enterprise system identifies sources of event data and sends queries towards the sources of the event data. The query components are processed close to the data source. The responses are combined to generate an event query response that indicates the event data of each of the query components." Query decomposition is only based on location of data, and there is no disclose of capability-based decomposition nor of dynamic query plan revision. U.S. Pat. No. 8,195,648 describes query portioning under the condition that the query contains a partitioning operator such as a GROUP BY.

EP 13 190 497.1, filed on Oct. 28, 2013, describes registration of event sources and channels in a repository. Leng et al., "Distributed SQL Queries with Bubblestorm," in Sachs, K., Petrov, I., Guerrero, P. (Eds.): From Active Data Management to Event-Based Systems and More, Springer LNCS 6462, describes a selection of one or more processing nodes based on several (e.g., cost) criteria in an environment in which typically both data and queries are replicated.

The references noted above, which are each hereby incorporated herein by reference, provide various approaches for event processing. They do not, however, address scenarios where, caused by a dynamic context change, query decomposition must consider rules and limitations that dynamically change. The references do not effectively take into account restrictions that arise from limited bandwidth and/or limited capabilities of processing nodes. Moreover, the techniques described in the references have no provision for dynamic query re-decomposition. Further, the techniques described in the references may not make effective use of repository data for query decomposition.

Thus, it will be appreciated by those skilled in the art that further improvements could be made with respect to CEP processes and/or systems, e.g., to provide for the above-described and/or other features. For instance, it will be appreciated by those skilled in the art that it would be desirable to provide capability-aware dynamic distributed event processing.

In certain example embodiments, a system for distributed event processing including a plurality of processing resources and a capability repository is provided. A first processing resource from the plurality of processing resources is configured to: receive a plurality of event streams from a plurality of operating contexts; identify, based upon the received event streams, a dynamically changing condition in a first one of said operating contexts; automatically decompose, based upon information stored in the capability repository, a complex event processing (CEP) query to effect a change responsive to the identified dynamically changing condition in the first one of said operating contexts; based upon the decomposed query, cause the first one of said operating contexts to effect the change; and effect a related change to operation of the first processing resource, the related change corresponding to the change caused to the first one of said operating contexts. The capability repository is configured to store information regarding (a) a plurality of event sources that each transmit events to at least one of said processing resources, and (b) the plurality of operating contexts, each operating context being associated with a respective group of event sources and being associated with at least one of said plurality of processing resources.

In certain example embodiments, the automatic decomposing may comprise forming a first sub-query configured to effect the change, and said causing the change may include deploying the first sub-query to a second processing resource associated with the first one of said operating contexts.

In certain example embodiments, the plurality of event streams may be received from respective ones of the operating contexts in accordance with the CEP query, and a partial subset of the operating contexts may be altered in response to the identified dynamically changing condition in the first one of said operating contexts.

In certain example embodiments, the automatic decomposing may be based upon the stored information including information regarding bandwidth capabilities and/or processor capabilities of the first one of the operating contexts; the dynamically changing condition may include an alteration of an association between at least one event source and the first processing context; etc.

In certain example embodiments, the first processing resource may be further configured to cause the first one of said operating contexts to (a) store locally-generated events without transmitting to the first processing resource when communication bandwidth is determined to be low between the first processing context and the first processing resource, and (b) transmit locally-generated events substantially in real-time when said communication bandwidth is not low between the first processing context and the first processing resource.

Analogous and/or related methods and/or computer readable storage media may be provided in different example embodiments. For example, in certain example embodiments, a method for distributed event processing is provided. Event streams from a plurality of operating contexts are received at a first processing resource of a plurality of processing resources. A capability repository stores information regarding (a) a plurality of event sources that each transmit events to at least one of the processing resources, and (b) the plurality of operating contexts, each operating context being associated with a respective group of event sources and being associated with at least one of said plurality of processing resources. Based upon the received event streams, a dynamically changing condition in a first one of said operating contexts is identified. Based upon the stored information, a complex event processing (CEP) query is automatically decomposed to effect a change responsive to the identified dynamically changing condition in the first one of said operating contexts. Based upon the decomposed query, the first one of said operating contexts is caused to effect the change. The automatic decomposing comprises forming a first sub-query configured to effect the change, and said causing the change includes deploying the first sub-query to a second processing resource associated with the first one of said operating contexts.

In certain example embodiments, there is provided a non-transitory computer readable storage medium having instructions stored thereon that, when executed by a first processing resource of a plurality of processing resources, cause the first processing resource to perform operations comprising: receiving event streams from a plurality of operating contexts, wherein a capability repository stores information regarding (a) a plurality of event sources that each transmit events to at least one of the processing resources, and (b) the plurality of operating contexts, each operating context being associated with a respective group of event sources and being associated with at least one of said plurality of processing resources; identifying, based upon the received event streams, a dynamically changing condition in a first one of said operating contexts; automatically decomposing, based upon the stored information, a complex event processing (CEP) query to effect a change responsive to the identified dynamically changing condition in the first one of said operating contexts; and based upon the decomposed query, causing the first one of said operating contexts to effect the change.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments incorporate techniques that provide for decomposing complex event processing (CEP) queries in a way that takes into account capabilities of the involved event processing agents, and for dynamically adapting query decomposition to changing conditions. Certain example embodiments apply to scenarios that involve multiple event processing agents. The example techniques may be particularly beneficial, for example, if the event processing agents differ in their processing capabilities and/or if there are bandwidth limitations between the event processing agents. Certain example embodiments help overcome many disadvantages of conventional distributed event processing. More particularly, certain example embodiments advantageously provide for taking into account limited bandwidth and limited processor capabilities, e.g., in order to decompose a query such that the decomposition is customized for a specific situation; automatic deployment of query sub-graphs to the involved local event processing agents; automatic re-computation of query decomposition based on a system-intrinsic mechanism, e.g., using complex event processing mechanisms to control complex event processing, when changes in the context occur; maintaining the system state in a repository; delayed transmission of data that cannot immediately be transferred due to bandwidth limitations; etc.

Figure 1:
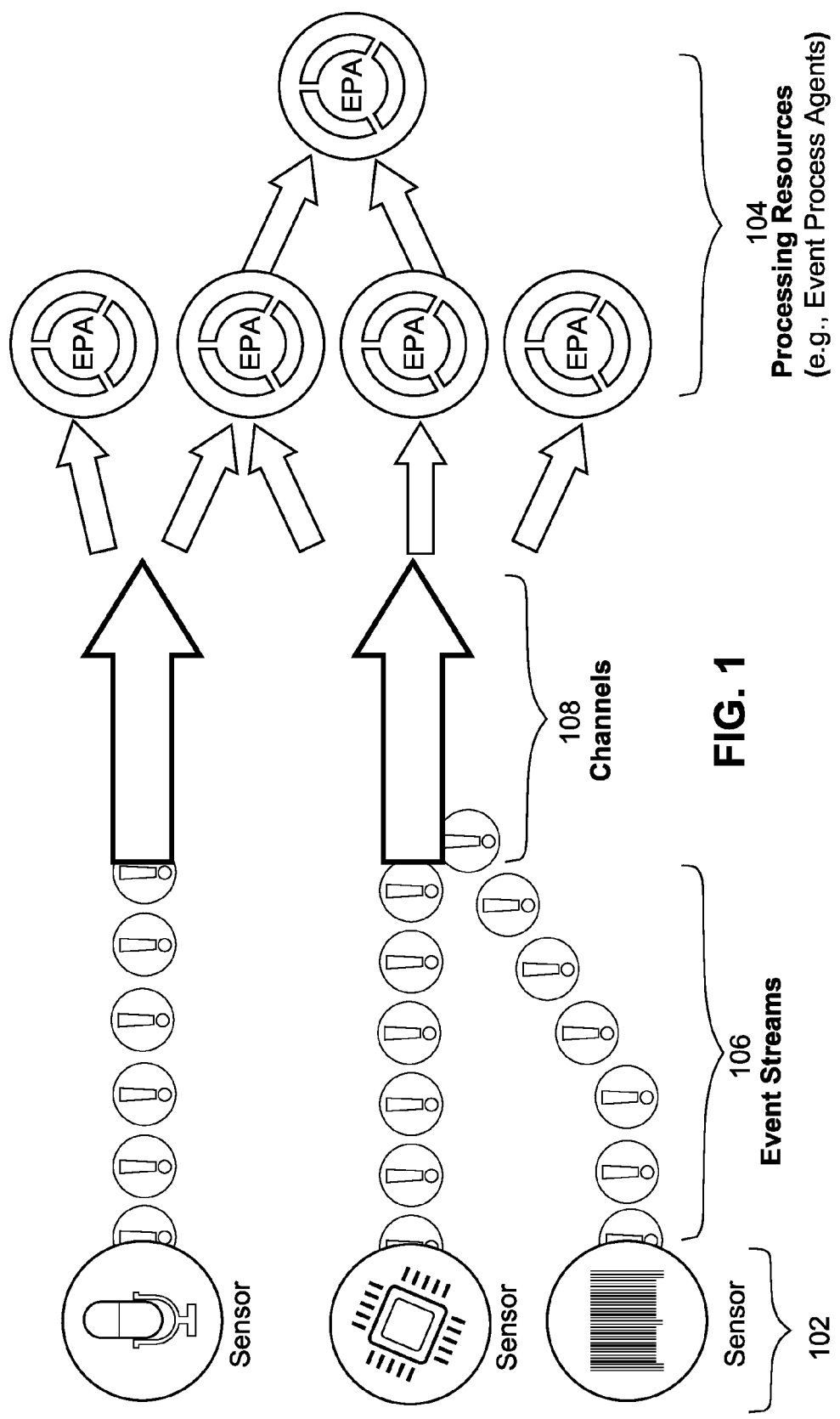
FIG. 1 is a simplified schematic view of a typical CEP system and its environments.

FIG. 1 is a simplified schematic view of a typical CEP system and its environments. It also will be appreciated that FIG. 1 illustrates some of the CEP concepts referred to in the embodiments described herein. The results produced by event processing agents (EPAs) may serve as input for further event processing agents. As shown in FIG. 1, various types of event sources 102 (e.g., sensors or other monitoring input sources) provide streams 106 of events to event processing agents 104. Each EPA 104 includes processing resources (e.g., a processor, memory, data store, and/or the like). The event streams 106 may be organized into one or more channels 108 from which EPAs 104 read data. In some instances, each EPA 104 may read from, and publish events to, one or more channels 108. Similarly, in some instances, each event source 102 may read from, and publish events to, one or more channels 108. Of course, it will be appreciated that a channel 108 may have any number of event streams 106 and that an EPA 104 can receive data from multiple channels.

Figure 2:
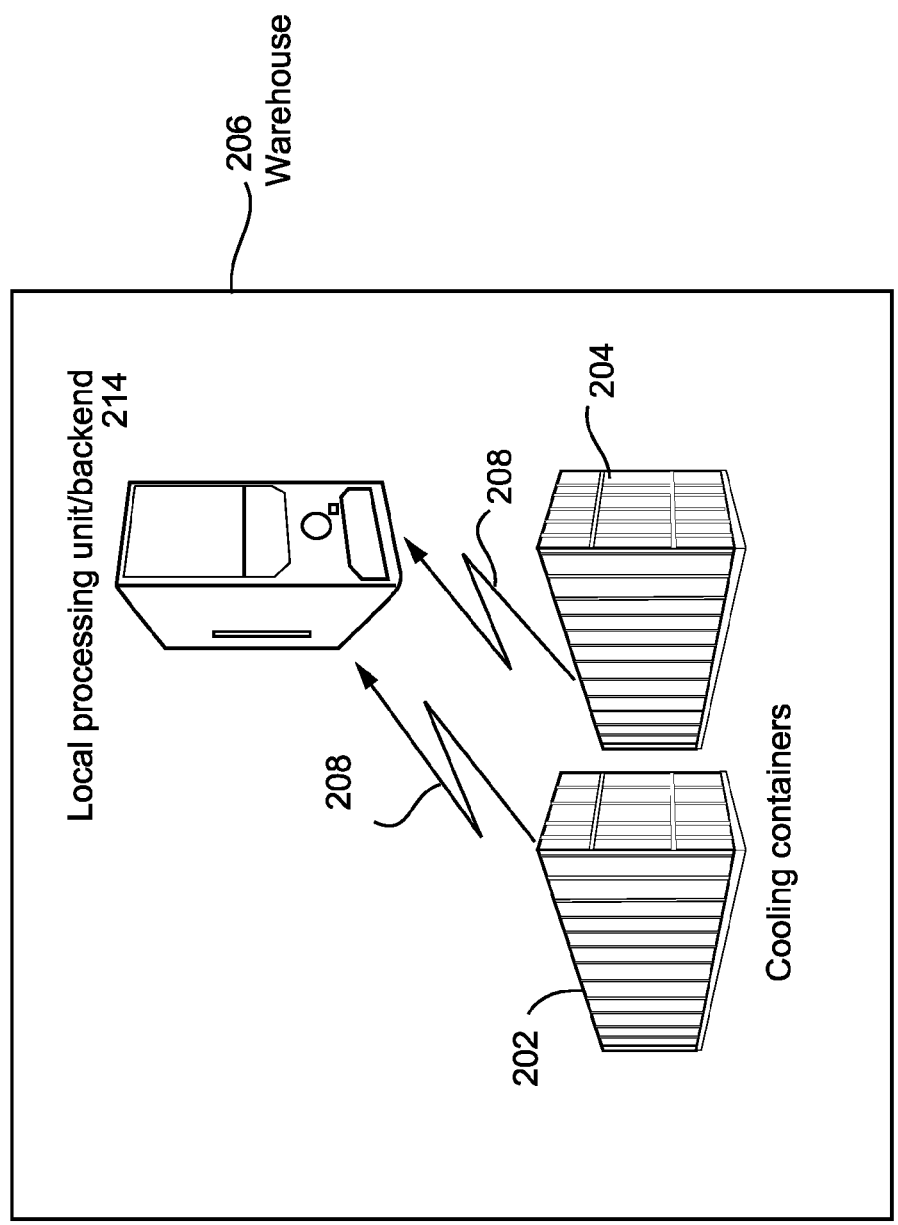
FIG. 2 illustrates a first scenario in which CEP is used to monitor cooling containers in a warehouse, in accordance with certain example embodiments.
Figure 3:
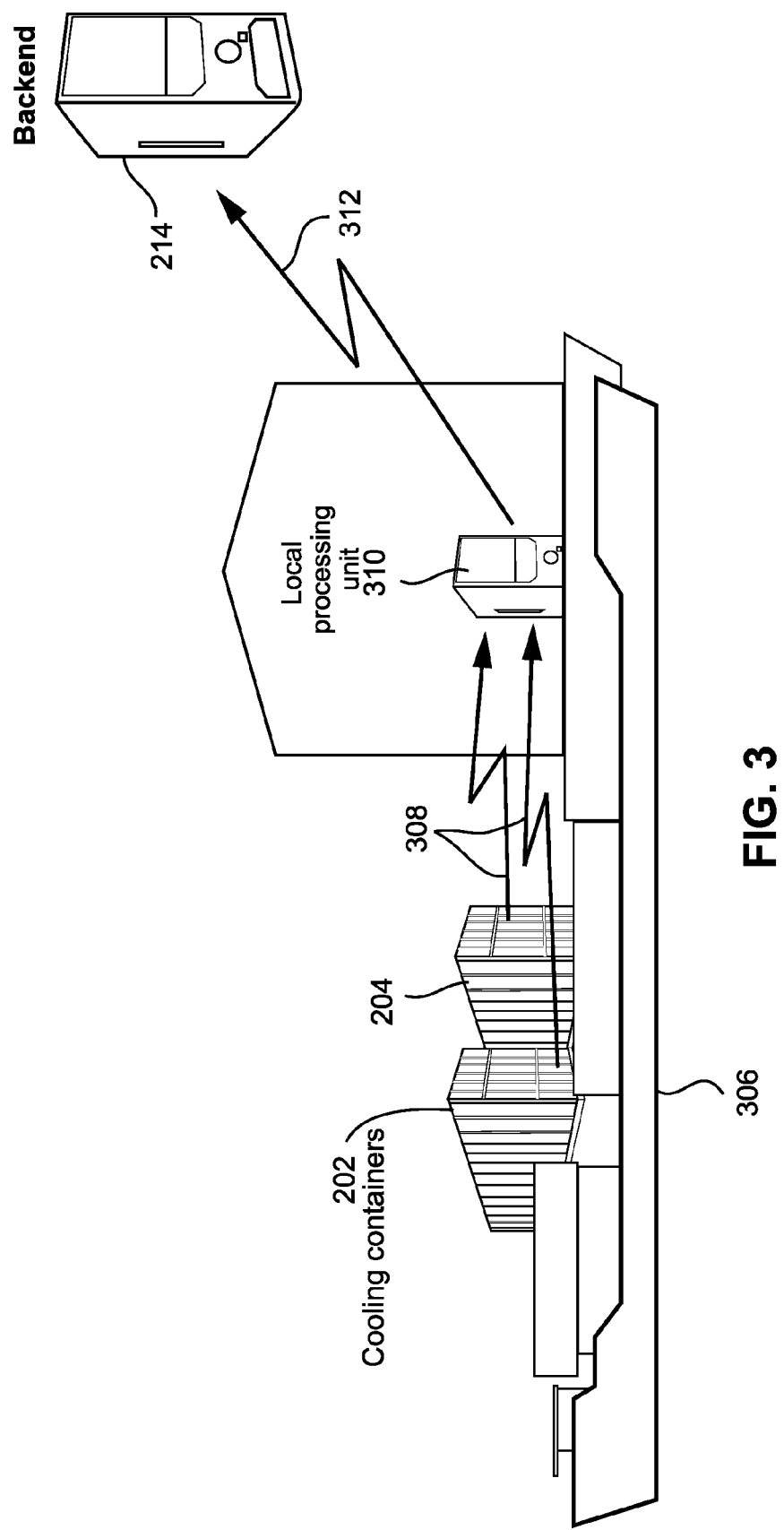
FIG. 3 illustrates a second scenario in which CEP is used to monitor cooling containers in a container ship, in accordance with certain example embodiments.

FIG. 2 and FIG. 3 show example scenarios in which embodiments can be advantageously utilized. In such example, it is assumed that a logistics company is engaged in shipping bananas on behalf of a large food retailer. Bananas are typically packed into cooling containers in the country of origin. The cooling containers may be equipped with cooling aggregates that keep a predetermined temperature inside the container. However, the correct operation of the aggregates can be obstructed by many factors. For this reason, the conditions inside the container have to be checked regularly, typically several times a day, and adjusted because severe temperature variations may spoil the whole container load of bananas. In many previous techniques, this checking is performed manually, and is both expensive and error-prone. To reduce costs and improve the quality of the process, so-called "intelligent containers" have been developed, and they oftentimes are equipped with sensors for detecting temperature. They may also include sensors for detecting decay gasses and can therefore detect a state of the food within the container with a substantial degree of accuracy.

FIG. 2 illustrates a scenario where cooling containers 202 and 204 are stored in a warehouse 206, for example, of the logistics company. Containers 202 and 204 may, for example, be packed with bananas and beer, respectively, and may be stored in warehouse 206 awaiting shipping at a future date. Warehouse 206 may house a backend server (also referred to as backend processing unit or backend processing resource) 214 that operates to receive monitoring information from sensors in containers 202 and 204 over a local network 208. These containers typically communicate the sensor reading results via wireless communication (e.g., near-range wireless communication). The monitoring information received from respective containers may not be the same. For example, whereas the banana containers may have temperature and decay gas sensors, the containers that carry beer may be monitoring for a temperature (or range of temperatures) and/or pressure of the tanks Local network 208 provides a high bandwidth that is at least sufficient to transmit the sensor information from the containers 202 and 204 to the backend server 214, and also to transmit any control information from the backend server 214 to the containers 202 and 204. Basically, in the scenario shown in FIG. 2, the events from the sensors (e.g., monitoring data such as temperature measurements, pressure measurements, etc.) may be transmitted from the containers to the backend server without being limited by the available bandwidth. Detection of load conditions (e.g., temperature within containers not within predetermined range, excessive decay gasses, and/or other predetermined conditions or combination of predetermined conditions) can lead to local activities (e.g., checking and perhaps fixing/reconfiguring a cooling aggregate) but in some cases, it may be too late to fix the problem.

FIG. 3 illustrates a scenario in which the containers 202 and 204 are subsequently loaded on board a container ship 306. The container ship 306 may have its own local server 310 that is capable of receiving monitoring input data from sensors in the containers and performing some processing. The monitoring information from the sensors may be transmitted over a high bandwidth (e.g., bandwidth at least sufficient to transmit sensor data without being bandwidth limited) local network 308 from the containers to the container ship's local server 310. On the ship, there is a receiving station for the data transmission, with may be a dedicated computer, a container additionally equipped with additional processing power, and/or the like. However, data transmitted from local server 310 to backend server 214 at the warehouse is transmitted over a low bandwidth wide area network link 312. While a container is being transported in a ship, there is only very low bandwidth to transmit event and/or other data, and hence may not be possible to transmit all sensor readings. Rather, the data transmitted should be kept at a minimum. The kind of data that needs to be transmitted, however, depends on the information need in the logistics chain, which might vary from case to case. Hence, it is of limited use to hard-code any processing logic on board the ship. Rather, it would be advantageous to have the local processing logic extract exactly the data needed for further processing. Thus, in the scenario shown in FIG. 3, although there are no bandwidth limitations from the containers to the local server 310, the transmission between the local server 310 and the backend server 214 is bandwidth limited (e.g., insufficient bandwidth to accommodate all monitoring data from containers 202 and 204).

Note that when using conventional techniques, one would establish multiple independent CEP systems to cope with the scenarios described with respect to FIGS. 2-3. As a consequence, each change in the information needed may involve programming steps in multiple systems that would have to be coordinated manually, which could render the scenario unmanageable, considering the potential need to manual deploy queries on a multitude of low-bandwidth moving CEP systems in a coordinated manner.

In the examples with respect to FIGS. 2-3, the logistics chain may be controlled by a CEP-based system and the processing logic is encoded as CEP query, e.g., in an SQL-like language. Certain example embodiments decompose the CEP queries, identify those parts of the query that can be executed locally (on board the ship, in the example of FIG. 3) and deploy these query parts to the local processing unit (on board the ship), while the rest of the query is processed in a backend event processing agent (e.g., backend server).

Certain example embodiments transform the query into an operator graph using any of several well known query processing techniques, and then cut off a sub-graph, e.g., by introducing a channel submission between the sub-graph and the remaining graph. The sub-graph is then transmitted to the local processing unit (e.g., on board the ship).

For example, the following query (referred to as "query 1") can be used to generate an alert if the temperature readings in at least one container are above a threshold of 5 degrees for the period of one hour.

```
SELECT orderData.receiver, "Container temperature above threshold"
  as alert, containerID
FROM (SELECT MIN(temperature) as temp, containerID
      FROM TempReading WINDOW (RANGE 1 HOUR)
      GROUP BY containerID),
     orderData,
     shippingDetails
WHERE temp > 5 and containerID = shippingDetails.containerID and
  shippingDetails.orderID=orderData.orderID;
```

Figure 4:
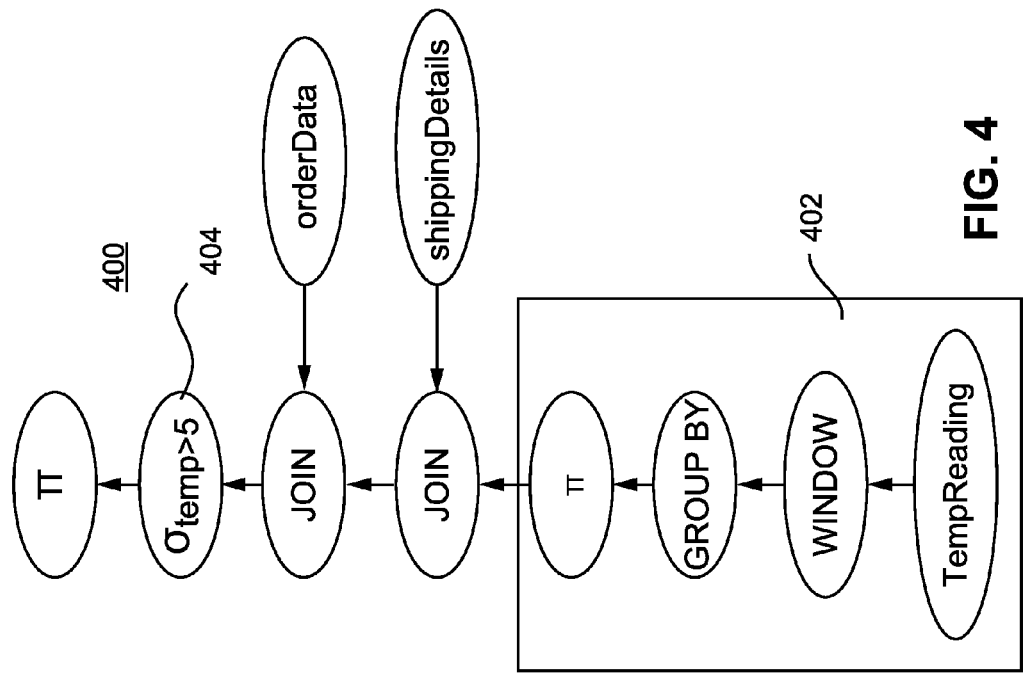
FIG. 4 illustrates a query graph generated, in accordance with certain example embodiments.

FIG. 4 illustrates an operator graph 400 corresponding to query 1 in slightly simplified form. Query 1 may be a CEP query that executes in order to detect and control the temperature within an intelligent container, such as intelligent containers 202 and 204 discussed above. Query 1 requires that the temperature readings from the containers be obtained and grouped. The obtained temperature information from sub-graph 402 is then joined with other information such as shipping details and order data so that a decision to control the temperature and/or the generation of an alert may be made with sufficient information. A selection 404 based on the temperature threshold is then performed upon the combined result.

Figure 5:
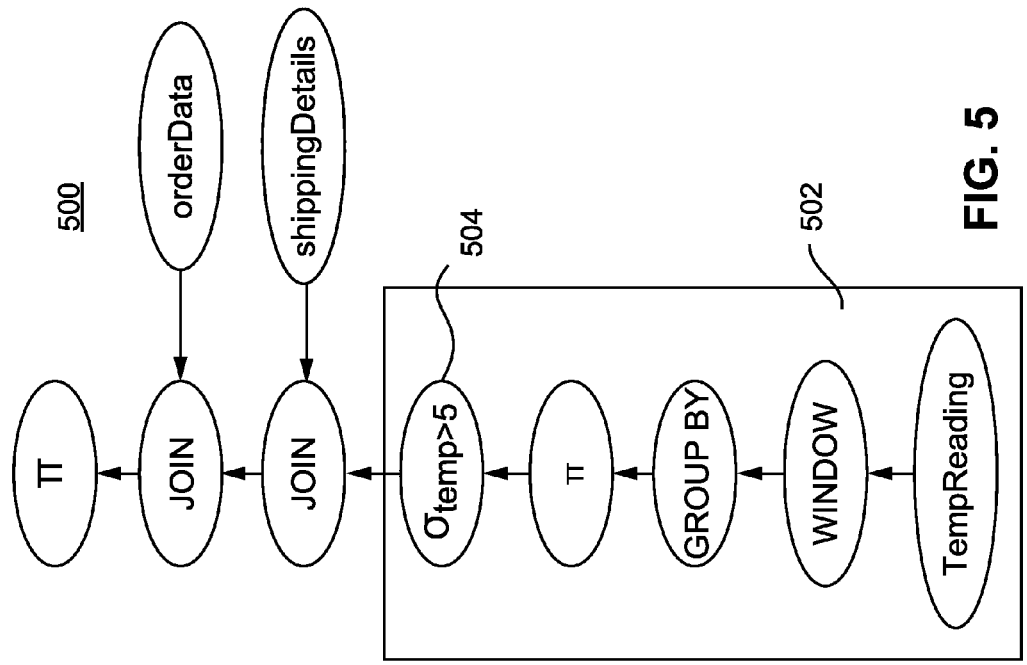
FIG. 5 illustrates the query graph of FIG. 4 after an optimization, in accordance with certain example embodiments.

FIG. 5 illustrates operator graph 500, which corresponds to operator graph 400, after an optimization is made to have the selection based upon the temperature threshold occur earlier in the query. Specifically, a "push selection down" optimization is performed such that the selection 504 based upon the temperature threshold now occurs within sub-graph 502. A person of skill in the art will appreciate that other optimizations and processing enhancements are possible, and are contemplated herein.

Figure 6:
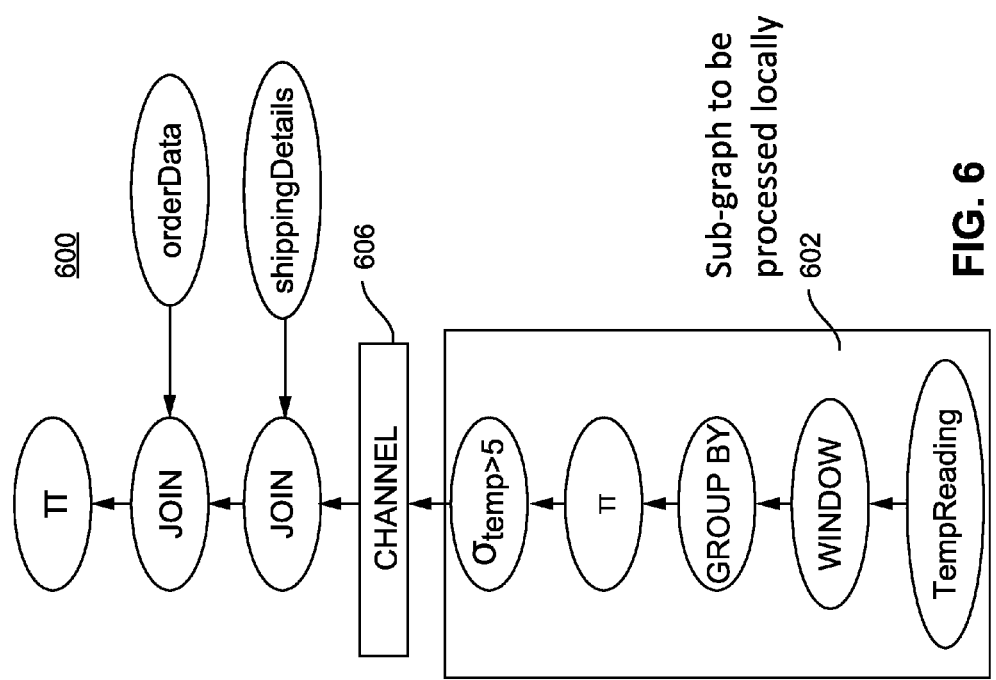
FIG. 6 illustrates a decomposed sub-graph that can be processed locally at a location separate from the backend server where the main processing occurs, in accordance with certain example embodiments.

FIG. 6 illustrates operator graph 600 decomposed such that the sub-graph 602 can be processed locally at a location remote from the backend server where the main processing occurs. Sub-graph 600 includes a channel 606 (e.g., a CEP channel) to represent that the result of the locally executed sub-graph 602 is transmitted to the backend server where the rest of the query is being processed. The backend server then joins the events received from the channel with other data (e.g., shipping details and/or order details stored in the locally-accessible repository) to obtain a restructured event stream. By restructuring the query such that a larger portion of the event data generated by event sources is processed locally to where it is generated (e.g., event data from temperature sensors in a container being processed on the ship currently holding that container), the use of potentially scarce network bandwidth may be optimized or otherwise improved.

The example of banana shipping has been used for illustration purposes only, and the example techniques disclosed herein are in no way restricted to this use case. Instead, the example techniques set forth herein may find applicability whenever capability-based query decomposition makes sense. Further examples from the field of transportation include the shipping of electronic components, for which a certain temperature range, but also some electromagnetic conditions, may need to hold (e.g., the shipping of certain types of flat screens that must not be tilt beyond a certain angle, a condition that is particularly hard to guarantee on a ship that swings by its very nature). Of course, transportation is one example field where capability-based query decomposition may be implemented, and other fields may take advantage of the example techniques set forth herein.

Figure 7:
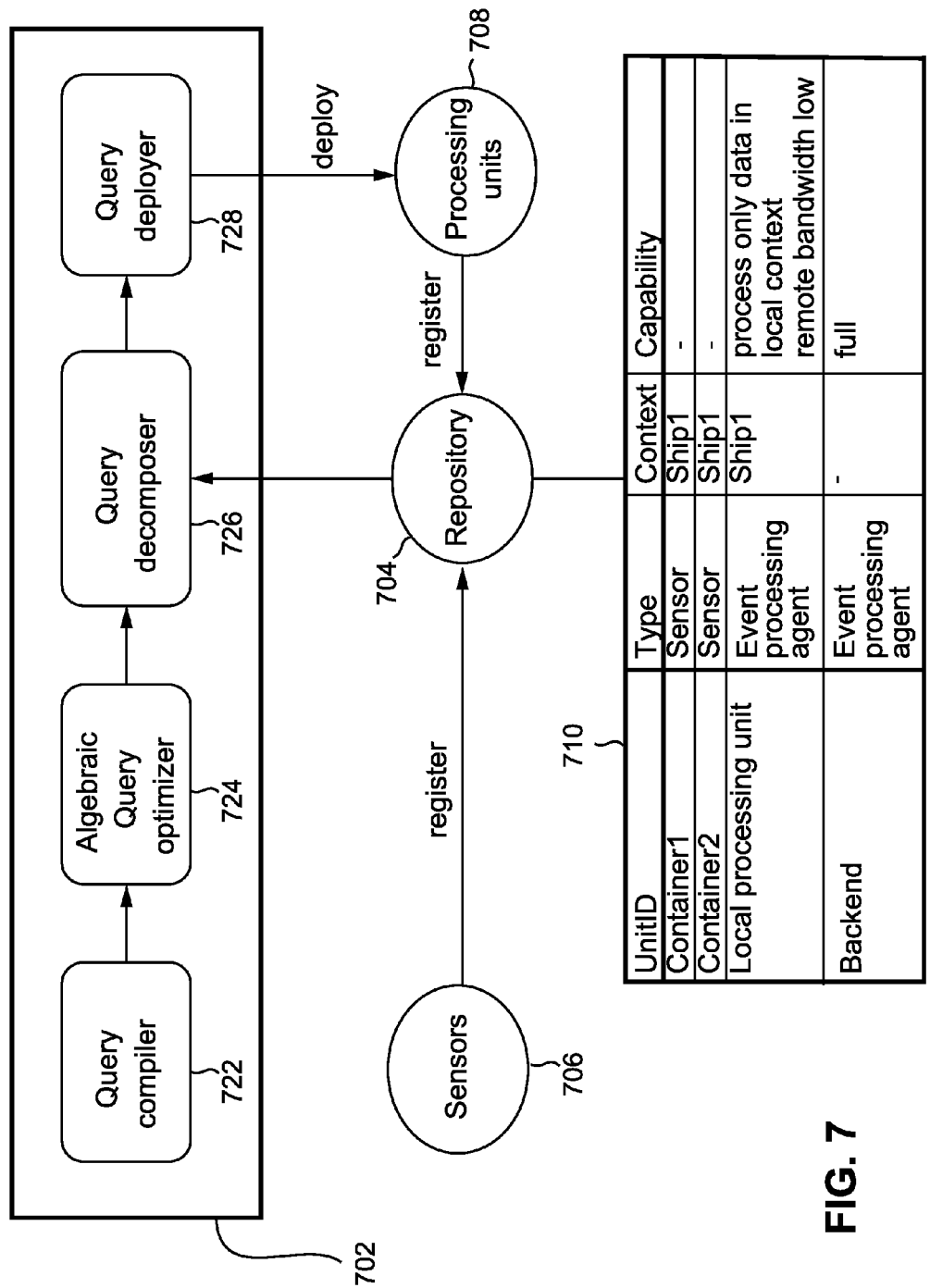
FIG. 7 illustrates certain components of a system for capability-based query decomposition, according to certain example embodiments.

FIG. 7 illustrates certain components of a system for capability-based query decomposition, according to one or more embodiments. Event sources 706 (e.g. sensors) and processing units 708 register with the repository (also referred to as "capability repository") 704. Event sources 706 may, as noted above, include any type of sensor that provides monitoring input to the query processing system. Temperature sensors and food decay gas sensors as discussed in the example above, and/or other sensors such as, for example, smoke sensors, impact sensors, motion sensors, vibration sensors, position sensors, etc., are other example sensors. Each processing unit 708 includes at least one processor and a memory, and is configurable to execute queries such as, for example, query 1 above. Query 1 may be specified in a high level language such as, for example, a CEP-specific language or other language capable of being used with CEP, may be compiled and made executable by at least one of the processing units 708 or other computer associated with the query processor 702.

A query processor 702 utilizes information from the repository 704 in order to determine a decomposition of a query. The information in repository 704 may be organized in a form such as, for example, a table 710. Each processing resource such as processing units 708, and each sensor such as sensors 706, may be represented as a separate row in table 710. For each row in table 710, a unit identifier to uniquely identify the particular processing resource or sensor, a type (e.g., whether the unit is a sensor, a processing resource, or the like), the operating context (e.g., whether the sensor or processing resource is located in the container ship or warehouse etc., may alternatively be herein referred to simply as context), and capabilities/limitations of the unit (e.g., whether the processing resource processes queries only in the local context, whether transmission bandwidth is limited or low, maximum number of connections, processing capacity, processing speed, etc.) are specified.

Table 710 may be updated by repository 704 by modifying, adding, and/or deleting one or more rows. For example, when a new sensor or processing resource is added to the system, a corresponding row may be automatically or manually added to table 710. When the operating context of a sensor changes such as, for example, when a container having the sensor is moved from a warehouse to a ship, the row corresponding to that sensor in table 710 is modified to indicate the change in the operating context. The capabilities/limitations associated with a particular context may be dynamically modified based upon sensor or other input. For example, a network and/or communication link congestion status for communications, processing capacity increase or decrease due to dynamic reconfiguration, and the like may be dynamically modified in the repository for a particular context.

The repository 704 includes table 710 and may provide and/or control access to that table. Repository 704 may include a database management system or other system to provide for the maintenance and access to data such as table 710.

The query processor 702 may include a query compiler 722, a query optimizer 724, a query decomposer 726 and a query deployer 728. Query compiler 722 accesses a query specified in CEP-specific or other continuous query compatible language and generates an operator graph corresponding to the query.

Query optimizer 724 may be configured to perform algebraic or other query optimization, and optimize or otherwise improve the query based upon the operator graph produced by query compiler 722. The query optimizer 724 may produce an optimized or otherwise improved operator graph corresponding to the query. It will be understood that query optimization may be performed in any manner, including in any well-known manner.

Query decomposer 726 decomposes the optimized operator graph to a plurality of sub-graphs (e.g., a sub-graph per processing context). Query decomposer 726 reads processing resource information and sensor information from repository 704 in order to determine an appropriate decomposition. In some aspects, an objective may be to decompose the query with respect to processing contexts so that the query is executable in the respective operating contexts (e.g., executable even in changed processing contexts). In some other aspects, an objective may be to decompose the query such that a large portion of events are processed locally to the source of events so that bandwidth use can be minimized. In yet other aspects, the objectives may include decomposing the query so that processing of events may be distributed according to the processing power of various operating contexts and of the backend.

Query deployer 728 operates to deploy one or more sub-graphs to processing resources. Deploying a sub-graph (or equivalently, sub-query) involves providing the sub-graph to a processing resource such that the processing resource can execute the sub-graph (e.g., sub-query). In certain embodiments, during deployment, a CEP channel may be dynamically configured between one or more of the monitoring input data sources and the processing resource to which the query was deployed.

Figure 8:
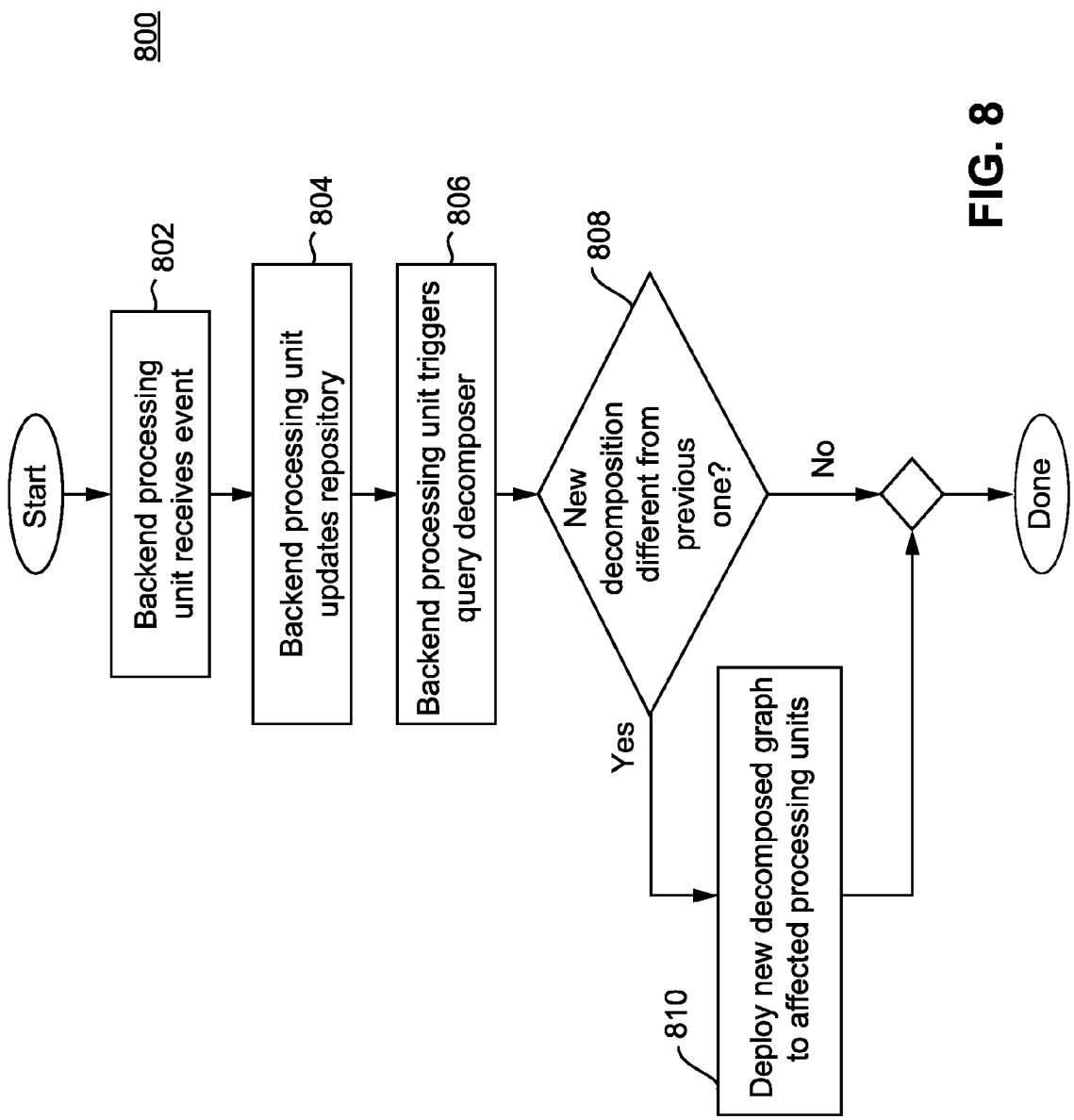
FIG. 8 illustrates a flowchart of a method for capability-aware dynamic distributed event processing, according to certain embodiments.
Figure 9:
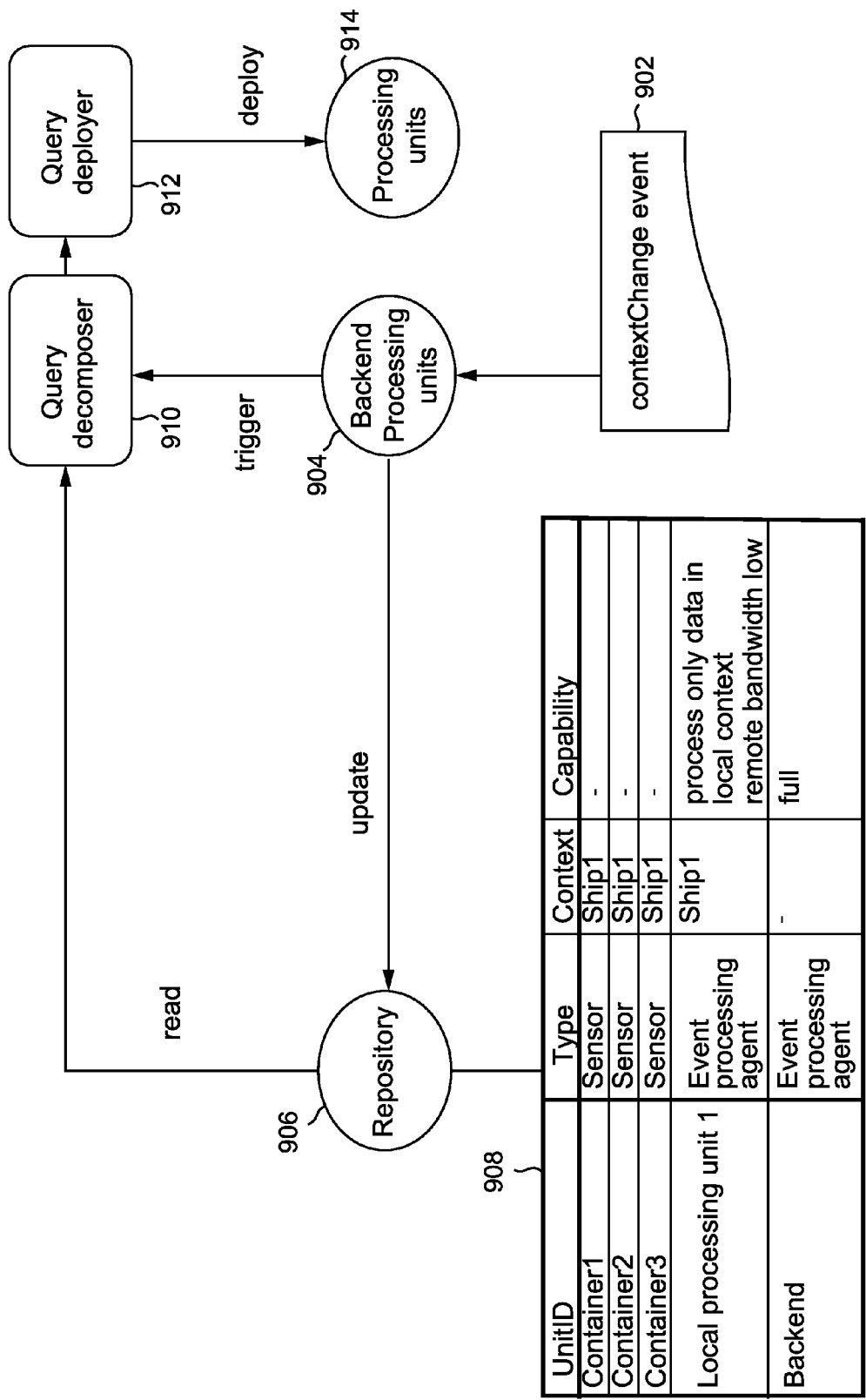
FIG. 9 schematically illustrates interactions among certain components of a system for capability-aware dynamic distributed event processing, according to certain embodiments.

FIGS. 8-9 illustrate a method for capability-aware query decomposition and system component interactions associated with the method, according to one or more embodiments. FIG. 8 illustrates a method 800 for capability-aware query decomposition, according to an embodiment. It will be understood that in some embodiments method 800 may be performed by performing one or more of operations 802-810 in the shown order, in an order different from that shown, without performing one or more of operations 802-810, or with one or more additional operations.

At operation 802, an event is received. The received event may be a context change event. For example, in the example described in relation FIGS. 2-3 above, a context change event may be triggered when a container (e.g., container 202 or 204) is moved from the warehouse storage to the container ship 206.

A context change event may be generated by any one suitable technique. According to an embodiment, a logistics system may generate the context change event, for example, when an operator updates the system to indicate that a particular container has now been moved to a container ship from the warehouse. According to another embodiment, a sensor on the container or on the container ship may detect the change and may automatically generate such an event. According to yet another embodiment, a predetermined rule may be set up in the backend server or an intermediate computer to detect a change in current location information regularly received from a plurality of containers and to generate a corresponding event. In yet another embodiment, a rule may be set up to detect a presence of a new container in a stream of currently carried containers received from a container ship and to generate a corresponding event.

Such an event might look like the following:

```
<ContextChange
  xmlns="http://softwareag/eventtypes/contextChange">
  <header valid-from="20130822:10:59:00" valid-
  to="20130822:11:00:00"/>
  <payload> <UnitID>Container3</UnitID>
    <type>Sensor</type>
    <context>Ship1</context>
    <capability></capability>
  </payload>
</ContextChange>
```

While the example shows the context change for a sensor (e.g., a container including a sensor being moved onto a particular ship), changes in a processing unit (e.g., change in processing capacity, etc) can be handled in a similar manner, as can new query needs.

At operation 804, the backend processing unit updates the repository to reflect the change of context in accordance with the received event. According to an embodiment, the backend processing unit updates a table or, more specifically, a row or rows corresponding to the processing resource and/or event source (e.g., sensor) associated with the context change event. In this example, the row in the repository table that corresponds to the container's sensor is modified to reflect that its operating context is now the container ship.

In the example embodiment described in relation to FIGS. 2-3 above, when the context change event involves a container being moved from the warehouse to the container ship, at operation 806, the backend processing unit triggers query decomposition. The query that is decomposed may be a currently executing CEP query.

Query decomposition may include reading the repository table, which now includes the updated operating context information, in order to identify the capabilities associated with the various processing resources that may be used in the querying process. In the example embodiment described in relation to FIGS. 2-3 above, when the repository has been modified to reflect that the container is now located in the operating context of the container ship, the query decomposer can determine from the repository that the container ship has bandwidth limitations.

Based upon the determined capability information, the query decomposer then determines a decomposition of the query in order to optimize the execution of the query in accordance with the capabilities of the various processing resources and/or dynamic changes in the operating environments.

At operation 808, it is determined whether the newly determined decomposition is different from the immediately preceding decomposition. This determination may be based upon a comparison of the new decomposed operator graph with the immediately preceding decomposed operator graph.

If the determination at operation 808 is positive, then at operation 810 the decomposed query graph is deployed to appropriate processing resources. According to certain example embodiments, one or more sub-graphs of the operator graph are deployed to respective processing resources that are remotely located from the backend processing resource. In the example scenario described in relation to FIGS. 2 and 3 above, when the graph is decomposed to have a sub-graph as shown in FIG. 5, the decomposed sub-graph is deployed to be executed by a processing resource on the container ship. Such a deployment can even occur while the ship is in transit, as this requires only low bandwidth.

The deploying of the new decomposition may be preceded in some embodiments by stopping or clearing some or all previously deployed sub-graphs.

As detailed above, data transmission from ship to backend may be limited by a very restricted bandwidth. In this scenario, this is the reason why the data must be aggregated, and transmitted data is preferably reduced to the absolute minimum necessary. However, the data accumulated onboard might be relevant for further analysis. Hence, this data can be stored locally and transmitted when higher bandwidth is available. For this purpose, the local processing unit can be enhanced to store and later transmit the data.

Method 800 ends subsequent to operation 810 or, in the event that there is no change in the decomposition detected, subsequent to operation 808.

FIG. 9 schematically illustrates interactions among certain components of a system for capability-based query decomposition when a method such as method 800 is performed. A context change event 902 such as, for example, a container being moved from a warehouse to a container ship, is detected by a backend processing unit 904.

The backend processing unit 904, updates a repository 906 to reflect the changed operating context for the moved container. For example, table 908 is modified to indicate that container 3 is now in the operating context of the container ship (e.g., instead of being in the operating context of the warehouse).

After updating the repository 906, the backend processing unit 904 triggers the query decomposer 910 in order to generate a new decomposition of the query graph.

Query decomposer 910 decomposes the operator graph of the query in accordance with the updated repository information. Query decomposer 910 may read table 908 from the repository 906.

After the decomposition, the query deployer 912 deploys one or more of the decomposed sub-graphs to processing units 914. One or more of the processing units 914 to which the sub-graphs are deployed may be located remotely from the backend processing unit 904.

A person skilled in the art will appreciate that, although some of the embodiments described above included only one sub-graph, the embodiments are not limited by the sub-graphs and can deploy respective sub-graphs to any number of processing units, e.g., in a one-to-one, one-to-many, many-to-one, or many-to-many cardinality.

Figure 10:
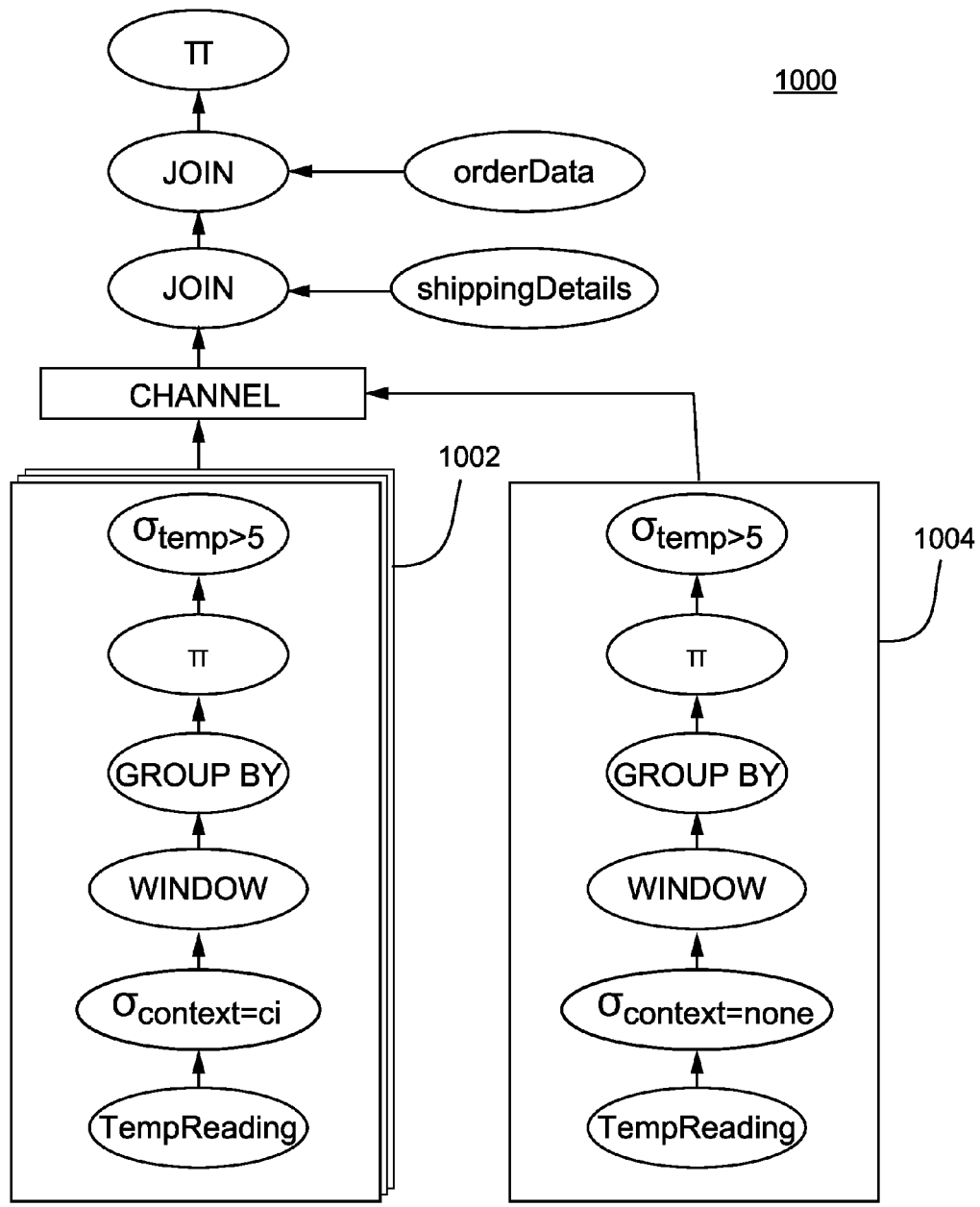
FIG. 10 illustrates a query graph with duplicated sub-graphs, according to certain embodiments.

The local processing unit on a ship can process data from containers on the respective ship, but usually not those from containers loaded on a different ship. As a consequence, it may not be sufficient to detect that a container is aboard a ship but, in addition, a specific "ship context" may be required for each container. The information about established ship contexts can be retrieved from the repository. Another consequence is that the query graph may be expanded by, e.g., duplicating the sub-graph and introducing grouping criteria to capture the ship context. FIG. 10 illustrates a query graph 1000, for query 1 discussed above, with duplicated sub-graphs 1002. Another sub-graph 1004 may be established to capture all context-less (e.g., input sources and/or processing resources to which a context has not been assigned in the repository) data. This sub-graph is typically not processed by a local processing unit but by a backend event processing agent.

Figure 11:
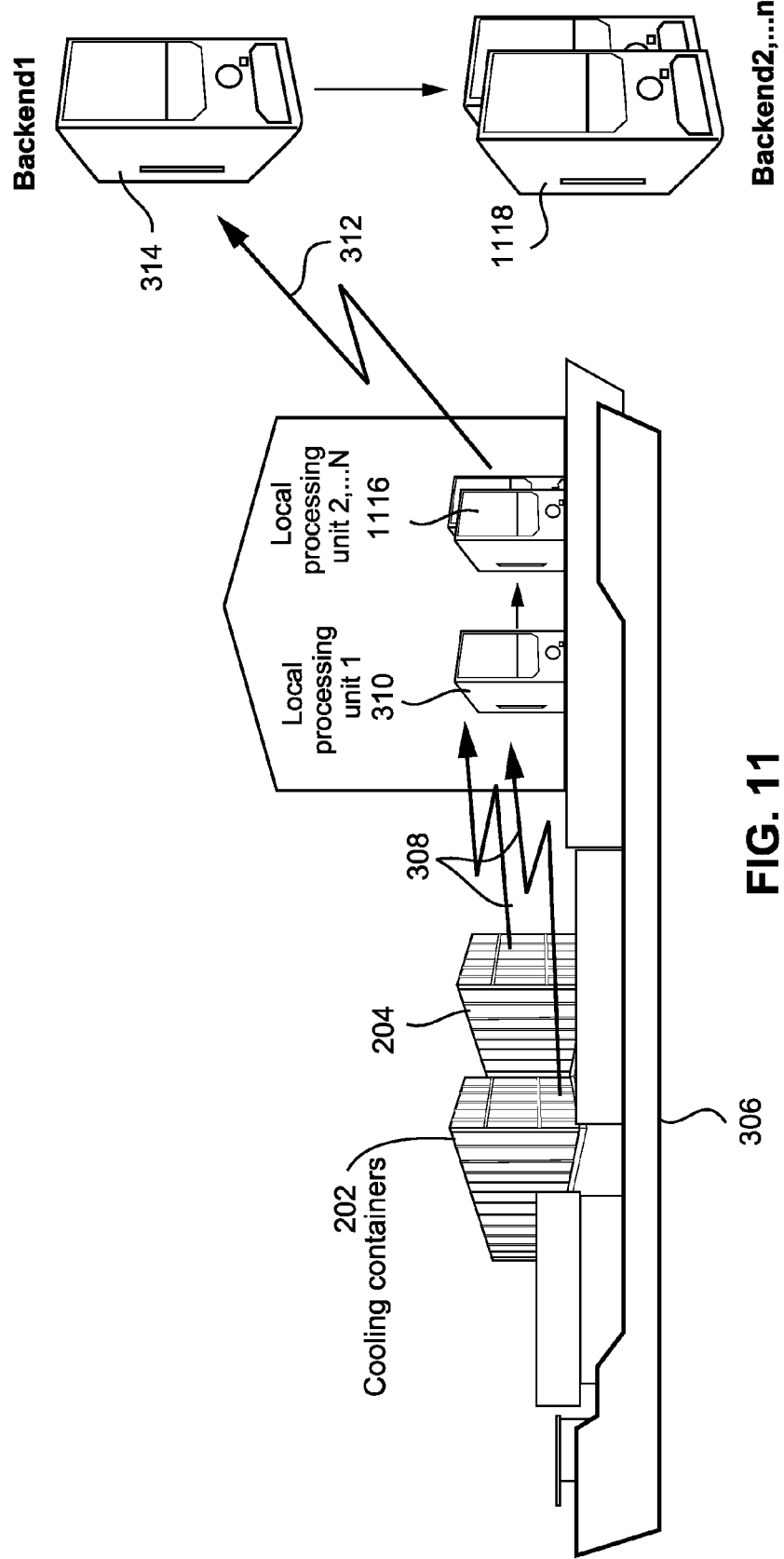
FIG. 11 illustrates a scenario in which multi-stage query processing takes place, according to certain embodiments.

For the sake of easier explanation, the above described embodiments have been described using a two-stage processing with one-to-many local processing unit and one backend. However, similar to as explained above, a person of skill in the art will appreciate that the teachings herein extend to a multi-stage approach where both on the local and the backend side as indicated by FIG. 11. FIG. 11 illustrates a container ship 306 to which containers 202 and 204 have been loaded for shipment. Containers 202 and 204 communicate with a processing unit 310 on board the ship over a local network 308. Communication between processing unit 310 and backend processing unit 314 is over a lower bandwidth network. FIG. 11 further illustrates an additional one or more local processing units 1116 and additional one or more backend processing units 1118. A sub-query deployed by the backend processing unit 314 to a local processing unit 310 may be executed by local processing units 310 and 1116 in a multi-stage manner. Similarly, the rest of the query processed at backend 314 may also be processed as a multi-stage process by backend processing units 314 and 1118.

Although certain example embodiments have been described in connection with an SQL-like language, it will be appreciated that this language is merely an example that does not necessarily correspond to any query language that is used (or is to be used) in a real system or all embodiments of this invention. Instead, it will be appreciated that the example techniques described herein are not dependent on any specific query language and may work with any query language for CEP.

Certain example capabilities have been identified above. It will be appreciated that other capabilities may be used in connection with, or in place of, some or all of these example capabilities. In this regard, the capabilities may be actual or known capabilities (e.g., actual free storage space, actual number of free connections, known bandwidth restrictions, communication protocols implemented and enabled, etc.), expected capabilities (e.g., expected network congestion, expected processing load based on load balancer data and/or the like, etc.), and/or combinations thereof.

Certain example embodiments work with event sources of any type. In this regard, it will be appreciated that event sources may be sensors, data generating activities, and/or the like, and that the reference to sensors in connection with certain example embodiments may refer instead or in addition to different kinds of event sources. The terms "event source" and "sensor" therefore should not be interpreted as being limited to any particular type of event source or sensor unless specifically claimed.

The "Event Processing Glossary" from the Event-Processing Technical Society (EP-TS) may be used to help understand certain terms used herein.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for distributed event processing, comprising:
a plurality of computer systems that each include processing resources the processing resources of each of the plurality of computer systems including at least a hardware processor and memory, the plurality of computer systems including a first computer system; and
an electronic storage system configured to store a capability repository, wherein:
the processing resources of the first computer system are configured to:
receive, via electronic data communications network, a plurality of event streams from a plurality of event sources that generate event data included in an event stream, each one of the plurality of event sources being associated with an operating context;
execute a complex event processing (CEP) query against the received plurality of event streams;
identify a change in the operating context for at least one of the plurality of event sources;
responsive to identification of the change in operating context for at least one of the plurality of event sources, automatically decompose, based upon information stored in the capability repository, the complex event processing (CEP) query by generating a first sub-query that is based on the CEP query;
deploy the generated first sub-query to a second computer system of the plurality of computer systems that is remote from the first computer and associated with the operating context of the at least one of the plurality of event sources;
the capability repository including information regarding (a) the plurality of event sources that each transmit event data, and (b) operating context(s) that are each associated with one or more of the event sources;
wherein prior to identification of the change in the operating context for at least one of the plurality of event sources, execution of the CEP query is carried out using the processing resources of the first computer system and after deployment of the first sub-query, the execution of the CEP query is carried out using a combination of the processing resources from the first and second computer systems.

2. The system according to claim 1, wherein the generating the first sub-query comprises:
determining an operator graph for the query;
computing the determined operator graph in accordance with at least one predetermined execution condition; and
determining the first sub-query based upon a sub-graph in the operator graph.

3. The system according to claim 2, wherein the predetermined execution condition includes (a) executability of the query using processing resources of the second computer system, and (b) executability of the query in view of bandwidth availability between the first computer system and the second computer system.

4. The system according to claim 1, wherein the deploying the first sub-query to a second computer system comprises: perform a comparison between the first sub-query to a previously deployed sub-query, wherein the deployment of the first sub-query is based on the performed comparison.

5. The system according to claim 1, wherein the operating context for other ones of the plurality of event sources are altered based on the identified change in the operating context for at least one of the plurality of event source.

6. The system according to claim 1, wherein the first processing resource is further configured to update the stored information in accordance with the identified change in operating context of the at least one of the plurality of event sources, the automatic decomposition of the CEP query is based upon the stored information including the updated stored information.

7. The system according to claim 1, wherein the automatic decomposing is based upon the stored information including information regarding bandwidth capabilities, processor capabilities, or both bandwidth capabilities and processor capabilities associated with the operating context for at least one of the plurality of event sources.

8. The system according to claim 1, wherein the change in the operating context for the at least one of the plurality of event sources includes a change in a location of the event source, a change in local processing resources available for processing event data from the event source, or a change in bandwidth between the first and second computer systems.

9. The system according to claim 1, wherein the first processing resource is further configured to cause the second computer system to transmit locally-generated events based on bandwidth availability between the second computer system and the first computer system.

10. A method for distributed event processing using plurality of computer systems that each include processing resources, the processing resources of each of the plurality of computer systems including at least a hardware processor and memory, the plurality of computer systems including a first computer system, the method comprising:
  receiving, via electronic data communications network, event streams from a plurality of event sources that generate event data included in an event stream, each one of the plurality of event sources being associated with an operating context;
  storing, to an electronic storage system, a capability repository that includes information regarding (a) the plurality of event sources that each transmit event data, and (b) operating context(s) that are each associated with one or more of the event sources;
  executing, using the processing resources of the first computer system, a complex event processing (CEP) query against the received plurality of event streams;
  identifying a change in the operating context for at least one of the plurality of event sources;
  responsive to identification of the change in operating context for at least one of the plurality of event sources, automatically decomposing, based upon the stored information, the complex event processing (CEP) query by generating a first sub-query that is based on the CEP query; and
  deploying the generated first sub-query to a second computer system of the plurality of computer systems that is remote from the first computer and associated with the operating context of the at least one of the plurality of event sources;
  wherein prior to identification of the change in the operating context for at least one of the plurality of event sources, execution of the CEP query is carried out using the processing resources of the first computer system and after deployment of the first sub-query, the execution of the CEP query is carried out using a combination of the processing resources from the first and second computer systems.

11. The method according to claim 10, further comprising modifying the complex event query of the first computer system to be a second sub-query that is based on the executing CEP query.

12. The method according to claim 10, wherein the operating context for other ones of the plurality of event sources are altered based on the identified change in the operating context for at least one of the plurality of event sources.

13. The method according to claim 10, wherein the first processing resource is further configured to update the stored information in accordance with the identified change in operating context of the at least one of the plurality of event source, and wherein the automatic decomposition of the CEP query is based upon the stored information including the updated stored information.

14. The method according to claim 10, wherein the automatic decomposing is based upon the stored information including information regarding bandwidth capabilities, processor capabilities, or both bandwidth capabilities and processor capabilities associated with the operating context for at least one of the plurality of event sources.

15. The method according to claim 10, wherein the change in the operating context for the at least one of the plurality of event sources includes a change in a location of the event source, a change in local processing resources available for processing event data from the event source, or a change in bandwidth between the first and second computer systems.

16. A non-transitory computer readable storage medium having instructions stored thereon for use with a first computer system of a plurality of computer systems that each include processing resources, the processing resources of each of the plurality of computer systems including at least a hardware processor and memory, the stored instructions causing the processing resources of the first computer system to perform operations comprising:
  receiving, via electronic data communications network, event streams from a plurality of event sources that generate event data included in an event stream, each one of the plurality of event sources being associated with an operating context, wherein an electronic storage system is configured to store a capability repository that includes information regarding (a) the plurality of event sources that each transmit event data, and (b) operating context(s) that are each associated with one or more of the event sources;
  executing a complex event processing (CEP) query against the received plurality of event streams;
  identifying a change in the operating context for at least one of the plurality of event sources;
  responsive to identification of the change in operating context for at least one of the plurality of event sources, automatically decomposing, based upon the stored information, the complex event processing (CEP) query by generating a first sub-query that is based on the CEP query; and
  deploying the generated first sub-query to a second computer system of the plurality of computer systems that is remote from the first computer and associated with the operating context of the at least one of the plurality of event sources;

wherein prior to identification of the change in the operating context for at least one of the plurality of event sources, execution of the CEP query is carried out using the processing resources of the first computer system and after deployment of the first subquery, the execution of the CEP query is carried out using a combination of the processing resources from the first and second computer systems.

17. The non-transitory computer readable medium according to claim 16, wherein the operating context for other ones of the plurality of event sources are altered based on the identified change in the operating context for at least one of the plurality of event sources.

18. The non-transitory computer readable medium according to claim 16, wherein the first processing resource is further configured to update the stored information in accordance with the identified change in operating context of the at least one of the plurality of event sources, and wherein the automatic decomposition of the CEP query is based upon the stored information including the updated stored information.

* * * * *